(12) United States Patent
Norris

(10) Patent No.: US 8,699,390 B2
(45) Date of Patent: Apr. 15, 2014

(54) CALL ROUTING METHOD AND APPARATUS

(75) Inventor: Jeremy Norris, Yateley (GB)

(73) Assignee: Morpho Cards GmbH, Flintbek (DE)

( * ) Notice: Subject to any disclaimer, the term of this patent is extended or adjusted under 35 U.S.C. 154(b) by 165 days.

(21) Appl. No.: 13/003,912

(22) PCT Filed: Jul. 15, 2009

(86) PCT No.: PCT/EP2009/059069
§ 371 (c)(1),
(2), (4) Date: May 9, 2011

(87) PCT Pub. No.: WO2010/007095
PCT Pub. Date: Jan. 21, 2010

(65) Prior Publication Data
US 2011/0211526 A1    Sep. 1, 2011

(30) Foreign Application Priority Data

Jul. 15, 2008  (EP) .................................. 08160419

(51) Int. Cl.
*H04B 7/00*   (2006.01)
*H04L 12/28*  (2006.01)
*H04M 3/42*   (2006.01)

(52) U.S. Cl.
USPC ................ 370/310.2; 370/392; 370/395.52; 379/211.05; 379/433.09

(58) Field of Classification Search
USPC ............... 370/310.2, 328, 356, 392, 395.31, 370/395.5, 395.52, 401; 379/211.05, 379/433.09
See application file for complete search history.

(56) References Cited

U.S. PATENT DOCUMENTS

| | | | |
|---|---|---|---|
| 2003/0009691 A1* | 1/2003 | Lyons et al. | 713/201 |
| 2003/0064731 A1 | 4/2003 | Angelo | |
| 2003/0112795 A1 | 6/2003 | Wilkes | |
| 2004/0209616 A1* | 10/2004 | Annic | 455/434 |
| 2007/0123235 A1* | 5/2007 | Newport et al. | 455/414.2 |
| 2008/0146280 A1 | 6/2008 | Sasse et al. | |
| 2008/0225806 A1* | 9/2008 | Arian et al. | 370/338 |
| 2011/0211526 A1* | 9/2011 | Norris | 370/328 |

FOREIGN PATENT DOCUMENTS

| EP | 1217851 A | 6/2002 |
|---|---|---|
| GB | 2445273 A | 7/2008 |

* cited by examiner

*Primary Examiner* — Benjamin H Elliott, IV
(74) *Attorney, Agent, or Firm* — Dentons US LLP

(57) ABSTRACT

The invention relates to a telecommunications chip card for carrying personalization data for connection to at least a mobile telecommunications network, said telecommunications chip card further comprising: means for receiving a dialed telephone number from a first wireless terminal coupled to a first network, wherein said first wireless terminal is adapted for initiating a call between said first wireless terminal and a second wireless terminal, wherein said dialed telephone number belongs to said second wireless terminal; means for obtaining a geographic location of said first wireless terminal; —means for fetching an access point address from a look-up table according to said geographic location, wherein said look-up table is stored in said telecommunications chip card, wherein said access point address belongs to an access point coupled to a second network and within said geographic location, wherein said second network is coupled to said first network; means for initiating a connection with said access point; means for sending said dialed telephone number to said access point for establishing connection through a third network between said first wireless terminal and a second wireless terminal having said dialed telephone number; means for connecting said call between said first and said second wireless terminal.

22 Claims, 5 Drawing Sheets

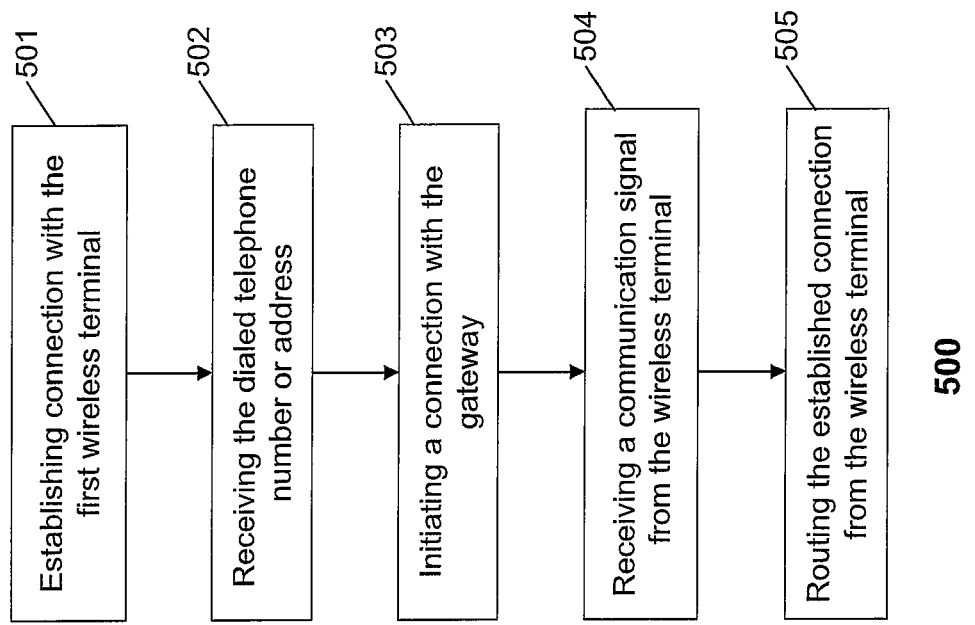

CALL ROUTING METHOD AND APPARATUS

FIELD OF THE INVENTION

The invention relates to a method for routing a call in a telecommunications chip card and in an access point, to a telecommunications chip card, to an access point and to a computer program product.

BACKGROUND AND RELATED ART

In network technologies such as GSM and UMTS, a telecommunications chip card is used in wireless terminals, ensuring the integrity and security subscriber's identity data. In UMTS and GSM, the telecommunications chip card may be, for example, a subscriber identity module (SIM), universal SIM or UMTS Integrated Circuit Card (UICC).

A typical example of a wireless terminal is the mobile telephone. However, other types of wireless terminals includes devices such as mobile personal data assistants (PDA), portable mobile computers provided with means for wireless communication.

The use of other network different to the home network may be known as roaming. An example of roaming is when a subscriber to a network operated in a first country uses the wireless terminal in another country when visiting the other country.

The routing of the call or data transmission can be completed in an alternative way to the standard route taken during the initiation of the call. There is therefore a need of a method for routing a call in a telecommunications chip card and in an access point, to a telecommunications chip card, to an access point and to a computer program product.

In GB-A-2 445 273 a mobile phone is disclosed with at least three communication interfaces. The mobile phone determines via a GPS interface its position. In a look-up table the location of a plurality of Wi-Fi hotspots is stored. When the user dials a telephone number and the mobile phone knows based on the GPS signal that it is in the area of a Wi-Fi hotspot, the connection to the device allocated to the user-dialed telephone number is established via the Wi-Fi network, an access point and a Voice over IP (VoIP) connection. A mobile phone according to the teaching of GB-A-2 445 273 therefore needs for the communication via the Wi-Fi network and the access point at least a GPS interface for knowing its position and a Wi-Fi interface. For using it as a phone outside the Wi-Fi hotspots additionally a common telephone interface, such as GSM or UMTS, is mandatory.

The disadvantages of a mobile phone according to the teachings of GB-A-2 445 273 is a high power consumption due to the permanent GPS communication and the connection to the access point via a Wi-Fi connection. Usually, a Wi-Fi connection consumes more power than a GSM or UMTS connection. Additionally, the teaching of GB-A-2 445 273 is only applicable for a minority of mobile phones because the majority does not have a GPS and/or a Wi-Fi interface. Thus, the teaching of GB-A-2 445 273 can not be applied on legacy phones.

SUMMARY OF THE INVENTION

The invention provides a telecommunications chip card for carrying personalization data for connection to at least a mobile telecommunications network, the telecommunications chip card further comprising: means for receiving a dialed telephone number from a first wireless terminal coupled to a first network, wherein the first wireless terminal is adapted for initiating a call between the first wireless terminal and a second wireless terminal, wherein the dialed telephone number belongs to the second wireless terminal; and means for obtaining a geographic location of the first wireless terminal.

The chip card further comprises means for fetching an access point address from a look-up table according to the geographic location, wherein the look-up table is stored in the telecommunications chip card, wherein the access point address belongs to an access point coupled to a second network and within the geographic location, wherein the second network is coupled to the first network; means for initiating a connection with the access point; means for sending the dialed telephone number to the access point for establishing connection through a third network between the first wireless terminal and a second wireless terminal having the dialed telephone number; and means for connecting the call between the first and the second wireless terminal.

Embodiments of the invention are advantageous in that the routing of the call or the data request selects the routing path according to the current geographic location of the wireless terminal, obtaining alternative routes that may be more efficient for the network or for the user. The chip card, the method or the application automatically initiates with a local access point based on the location without any intervention of the user of the wireless terminal. The access point selects the most efficient path according to the dialed telephone number or address of the final destination and the current location. The alternative routing of the call or data request may, for example, incur in lower costs for the user.

The telecommunications chip card may be, for example, a subscriber identity module (SIM) or a universal subscriber identity module (USIM). The geographic location is received by the SIM or USIM from the network. The geographic location is for example the country where the user is located. In some countries the information about the geographic location can also determine a certain region or part of a country. Usually a telecommunications network, for example like UMTS or GSM, contains information about the geographic location such that this location can be stored in the chip card.

Thereby, geographic location information is transmitted via the network to the SIM or USIM according to the GSM standard. According to the GSM standard a network identifier is transmitted to the wireless terminal and is temporarily stored in the SIM or USIM. The network identifier indicates the network provider. Thus, by knowing the network provider also the geographic location is known, e.g. the country where the wireless terminal is located.

For example, when the network identifier indicates the network provider to provide coverage in France, the geographic location information provided by the network to the SIM is France. According to embodiments of the invention the look-up table comprises the network address of at least one access point in France, e.g. the telephone number of the access point. The wireless terminal then establishes a connection to the French access point when the user dials a foreign telephone number of another country and the access point establishes a VoIP connection to the terminal allocated to the user-dialed telephone number. However, if the user dials a domestic French telephone number this procedure is not invoked.

The above described procedure can also be invoked if the user-dialed telephone number fulfils another predefined criterion. For example, every time a user dials a telephone number a program executed by the SIM is invoked in order to check if the user-dialed telephone number fulfils the predefined criterion. If the criterion is not fulfilled a regular telephone call is made. If the criterion is fulfilled the SIM uses the geographic location information stored on the SIM to access the look-up table in order to determine a telephone number of access point. The SIM then instructs the wireless terminal to dial the telephone number of the access point and the access point establishes the connection to the terminal allocated to the user-dialed telephone number via a VoIP connection.

The use of a SIM or USIM to store the location and to establish the connection is advantageous because almost every wireless terminal can be operated with a SIM or USIM, even wireless terminals being built several years ago. When a SIM or USIM is used, the SIM or USIM establishes the connection via a telecommunications network, like UMTS or GSM. There is no need that the wireless terminal has to be able to establish a connection via another network like Wi-Fi or the internet.

Only one interface is needed for receiving the regional location and for communicating with the access point.

The access point address in the look-up table can for example be a telephone number. For each geographic location—which can for example be a country—at least one telephone number is stored in the look-up table. In this case, the connection to the first access point is established via a telephone call. The telephone call to the access point can be established via any telecommunications network, for example GSM or UMTS.

Via the connection to the first access point the dialed telephone number is transmitted to the first access point. The first access point is connected to the first and to the second network. Preferably, the first network is a telecommunications network like GSM or UMTS and the second network is a TCP-based network, e.g. the internet.

Thus, the wireless terminal establishes a connection to the access point and sends the dialed telephone number to the first access point. The dialed telephone number is allocated to a second terminal in the third network. It is not necessary that the second terminal is a wireless terminal although it also can be a wireless terminal. Upon reception of the dialed telephone number, the access point establishes a connection to the second terminal through the second and the third network. The link between the second and the third network can, for example, be a gateway in another geographic location.

In other words, the chip card receives the dialed telephone number. For example, the phone number was dialed by the user of the wireless terminal. Then, the wireless terminal establishes a connection to the access point. This means, the user dials a telephone number but the wireless terminal does not dial the dialed telephone number. Instead, the wireless terminal dials a telephone number that is allocated to the first access point. Then, the wireless terminal transmits the user-dialed telephone number to the access point. The access point is connected via the first network to the wireless terminal and via a second network, e.g. the internet, to at least one gateway. The gateway is connected to the second and the third network. Preferably the third network is similar to the first network, i.e. a telecommunications network like GSM, UMTS or a landline network. The access point establishes a connection between the first wireless terminal in the first network and the second terminal in the third network via the first, second and third network.

Preferably, the telephone call from the first wireless terminal in the first network to the second terminal in the third network is established via a Voice over IP (VoIP) connection through the second network. This is mainly advantageous for telephone calls between wireless terminals being located in different countries since providers of telecommunications networks usually charge high costs for telephone calls between two different countries. Thus, by redirecting the call over the internet via a VoIP call, costs can be saved.

For example, when the user is not located in his home country and uses a chip card according to embodiments of the invention, any call request is directed to the access point. Therefore, the user dials a first telephone number and the chip card dials a second telephone number that is allocated to the access point. Then, the chip card transmits the first number to the access point that establishes a VoIP connection, for example via the internet, to the terminal that is allocated to the first telephone number.

Preferably, if the terminal allocated to the second telephone number is located in the same regional location as the chip card, the access point establishes a connection to the terminal via the network, where also the chip card is located. For example, the chip card is located in a certain country and the user dials a telephone number of the same country, the access point does not establish a connection via the internet to another access point. Instead, the access point establishes a connection via the network where also the chip card is located.

If, for example, the user is located in his home country and dials a number of a different regional location, the chip card also redirects the call via the first access point because by redirecting the call via a VoIP connection costs can be saved. Therefore, the chip card has means to compare the user-dialed telephone number to the regional location and means to determine whether a redirection of the call saves costs or not.

In other words, if the user dials an international number, the call is redirected at the wireless terminal to an access point having an access number in the user's country.

Thus, the wireless terminal is connected to the access point which in turn automatically completes the user's call to the international destination.

The use of a GSM or UMTS interface reduces the power consumption of the wireless terminal since a GSM or UMTS connection usually is always available and established by a common wireless terminal. It is advantageous that the GSM or UMTS network has a very high network coverage so that a chip card according to the invention can be used almost anywhere.

The user pays for a domestic rate GSM call to the access point in his home country. Thus, the user can make a low cost call to an international destination.

In embodiments of the invention the wireless terminal has means to ask the user, for example via display means of the wireless terminal, to decide whether the call shall be redirected or not.

The wireless terminal can, for example, be a mobile phone, a PDA or any other mobile telecommunication device.

Embodiments of the invention further comprise the telecommunications chip card, wherein the dialed telephone number is sent to the access point with a packet switched signaling or dual-tone multi-frequency signaling.

In embodiments of the invention the look-up table is updated via the first network from a core network component of the first or second network. The regional location is stored in the telecommunications chip card.

In embodiments of the invention the third network comprises a gateway adapted for establishing connection between the access point and the second wireless terminal.

According to embodiments of the invention the user dials a telephone number with the wireless terminal. For example, the user uses the keypad or a touch screen to dial a telephone number. The wireless terminal transmits the user-dialed telephone number to the chip card. The chip card determines, based on the user-dialed telephone number and the geographic location information stored on the chip card, if the user-dialed telephone number is to be dialed directly by the wireless terminal or if a connection to the access point is to be established, e.g. by dialing the telephone number of the access point and then transmitting the user-dialed telephone number to the access point for establishing a VoIP connection.

In embodiments of the invention the chip card sends a message via the wireless terminal to the access point when the chip card receives a user-dialed telephone number. The message comprises the user-dialed telephone number. The access point establishes a connection to the terminal allocated to the user-dialed telephone number, e.g. via the same network or the second and the third network.

The message can for example be a short message service message (SMS message) which can be transmitted via a telecommunications network like GSM or UMTS. The connection to the terminal allocated to the user-dialed telephone number can be established via the telecommunications network, e.g. GSM or UMTS, or via a VoIP connection through a gateway.

Upon reception of the message, the access point calls the telephone number received with the message and establishes a connection to the wireless terminal, from which the message was received, via the telecommunications network.

Thus, costs can be saved. The chip card sends a message and receives an incoming connection from the access point. Then, a VoIP connection or a connection via the telecommunications network is established with the terminal allocated to the user-dialed telephone number. This procedure can be more cost-effective than a direct call from the chip card to the terminal allocated to the user-dialed telephone number.

In other words, the wireless terminal in combination with the access points uses a call back method. This call back can be useful at the user's home or when the user travels abroad. The call establishment happens behind the scenes. The user just dials and waits for the call establishment. When the user makes a call to an international number or any number when the user is roaming abroad, the wireless terminal automatically sends an SMS message to the access point requesting the call. The access point calls the user and also places the onward call.

Thus, the user pays for a GSM SMS to the access point, the access point may be in another country than the user and inbound call charges from the user's cellular provider.

In another aspect, the invention relates to an access point for a first mobile telecommunications network comprising: means for establishing a connection with a first wireless terminal in a second network; means for receiving a dialed telephone number from the first wireless terminal, wherein the dialed telephone number belongs to a second wireless terminal; means for initiating a connection with a gateway; means for receiving a communication signal from the first wireless terminal; and means for routing the established connection from the first wireless terminal to the gateway for communication with the second wireless terminal.

In embodiments of the invention the dialed telephone number is sent to the access point with a packet switched signaling or dual-tone multi-frequency signaling. The access point of the embodiments further comprising an Interactive Voice Response system for capturing the dialed telephone number.

The access point of the embodiments further comprising means for converting the communications signal from a first protocol to a second protocol, wherein the first protocol is signaling system 7 and the second protocol is voice over IP.

In embodiments of the invention the first mobile telecommunications network is a mobile telephone network, e.g. UMTS or GSM. The access point is allocated to a telephone number and has means for accepting connections and receiving messages from wireless terminals connected to the mobile telephone network. Further, the access point has means for establishing connections to a terminal. The terminal can be a wireless terminal, although this is not mandatory. Further, the terminal can be connected with the mobile telephone network, to which also the access point is connected, or the terminal can be connected to another network.

In embodiments of the invention the connection to between two terminals is established upon reception of a message from a first wireless terminal comprising a telephone number allocated to a second terminal. Means of the access point establish a connection between the first wireless terminal and the second terminal. Preferably, first the connection to the first wireless terminal is established and then a telephone call is sent to the second terminal. The message can, for example, be a short message service (SMS) message.

The telephone call to the second terminal can, for example, be sent via the network, to which the first wireless terminal is also connected. In another embodiment of the invention the telephone call is sent to the second terminal via a second and a third network connected to each other by a gateway. The second network can, for example be a TCP-based network like the internet and the telephone call can, for example, be a VoIP call. The third network can be a mobile telecommunications network or a landline telephone network.

In embodiments of the invention the connection between two terminals is established upon reception of a telephone call from the first wireless terminal. When the telecommunication is established with the first wireless terminal, the access point receives a dialed telephone number and establishes a connection to the second terminal allocated to this dialed telephone number. The connection can be established directly, for example when the second terminal is connected to the same network as the first wireless terminal, or the connection can be established via a second and a third network.

In embodiments of the invention the second network is for example a TCP-based network, e.g. the internet, and the connection to the second terminal is established via a VoIP connection. The third network can for example be a mobile telecommunications network or a landline telecommunications network.

In another aspect, the invention relates to a method for routing a call in a telecommunications chip card for carrying personalization data for connection to at least a mobile telecommunications network, the method comprising: receiving a dialed telephone number from a first wireless terminal coupled to a first network, wherein the first wireless terminal is adapted for initiating a call between the first wireless terminal and a second wireless terminal, wherein the dialed telephone number belongs to the second wireless terminal; obtaining a geographic location of the first wireless terminal; and fetching an access point address from a look-up table according to the geographic location, wherein the look-up table is stored in the telecommunications chip card, wherein the access point address belongs to an access point coupled to a second network and within the geographic location.

The method further comprises initiating a connection with the access point; sending the dialed telephone number to the access point for establishing connection through a third network between the first wireless terminal, wherein the dialed telephone number belongs to the second wireless terminal; and connecting the call between the first and the second wireless terminal.

In embodiments of the invention the dialed telephone number is sent to the access point with a packet switched signaling or dual-tone multi-frequency signaling, wherein the look-up table is updated via the first network, wherein the regional location is stored in the telecommunications chip card, wherein the third network comprises a gateway adapted for establishing connection between the access point and the second wireless terminal.

In embodiments of the invention the first network is a mobile telecommunications network, for example like UMTS or GSM.

In embodiments of the invention the geographic location of the first wireless terminal is a country or a part of a country.

In embodiments of the invention the access point address is a telephone number.

In embodiments of the invention the dialed telephone number is sent to the access point via a message. Preferably, the message is a short message service (SMS) message.

In embodiments of the invention the dialed telephone number is sent to the access point by a telephone call connection.

In embodiments of the invention the second network is a TCP-based network, e.g. the internet and the third network is a mobile telecommunications network, like UMTS or GSM, or a landline telecommunications network.

In embodiments of the invention the connection between the two terminals is established via a VoIP call.

In another aspect, the invention relates to a method for routing a call in an access point for a first mobile telecommunications network, the method comprising: establishing a connection with a first wireless terminal in a second network; receiving a dialed telephone number from the first wireless terminal, wherein the dialed telephone number belongs to a second wireless terminal; initiating a connection with a gateway; receiving a communication signal from the first wireless terminal; and routing the established connection from the wireless terminal to the gateway for communication with the second wireless terminal.

The method of the embodiments further comprises converting the communications signal from a first protocol to a second protocol, wherein the first protocol is signaling system 7 and the second protocol is voice over IP.

In embodiments of the invention the first network is a mobile telecommunications network, for example like UMTS or GSM.

In embodiments of the invention the dialed telephone number is sent to the access point via a message. Preferably, the message is a short message service (SMS) message.

In embodiments of the invention the dialed telephone number is sent to the access point by a telephone call connection.

In embodiments of the invention the gateway connects the second network to a third network.

The second terminal can, for example, be a wireless terminal although this is not mandatory. The second terminal can also be a terminal connected to telecommunication landline.

In embodiments of the invention the second network is a TCP-based network, e.g. the internet and the third network is a mobile telecommunications network, like UMTS or GSM, or a landline telecommunications network.

In embodiments of the invention the connection between the two terminals is established via a VoIP call.

In another aspect, the invention relates to a computer program product stored on a storage medium, comprising executable program means for causing a telecommunications chip card to perform a method according to any of the preceding embodiments when the program is run on the telecommunications chip card.

In another aspect, the invention relates to a computer program product stored on a storage medium, comprising executable program means for causing an access point to perform a method according to any of the preceding embodiments when the program is run on the access point.

BRIEF DESCRIPTION OF THE DRAWINGS

In the following preferred embodiments of the invention will be described in greater detail by way of example only making reference to the drawings in which:

FIG. 5 shows a flowchart of a call routing method in an access point.

DETAILED DESCRIPTION

Figure 1:
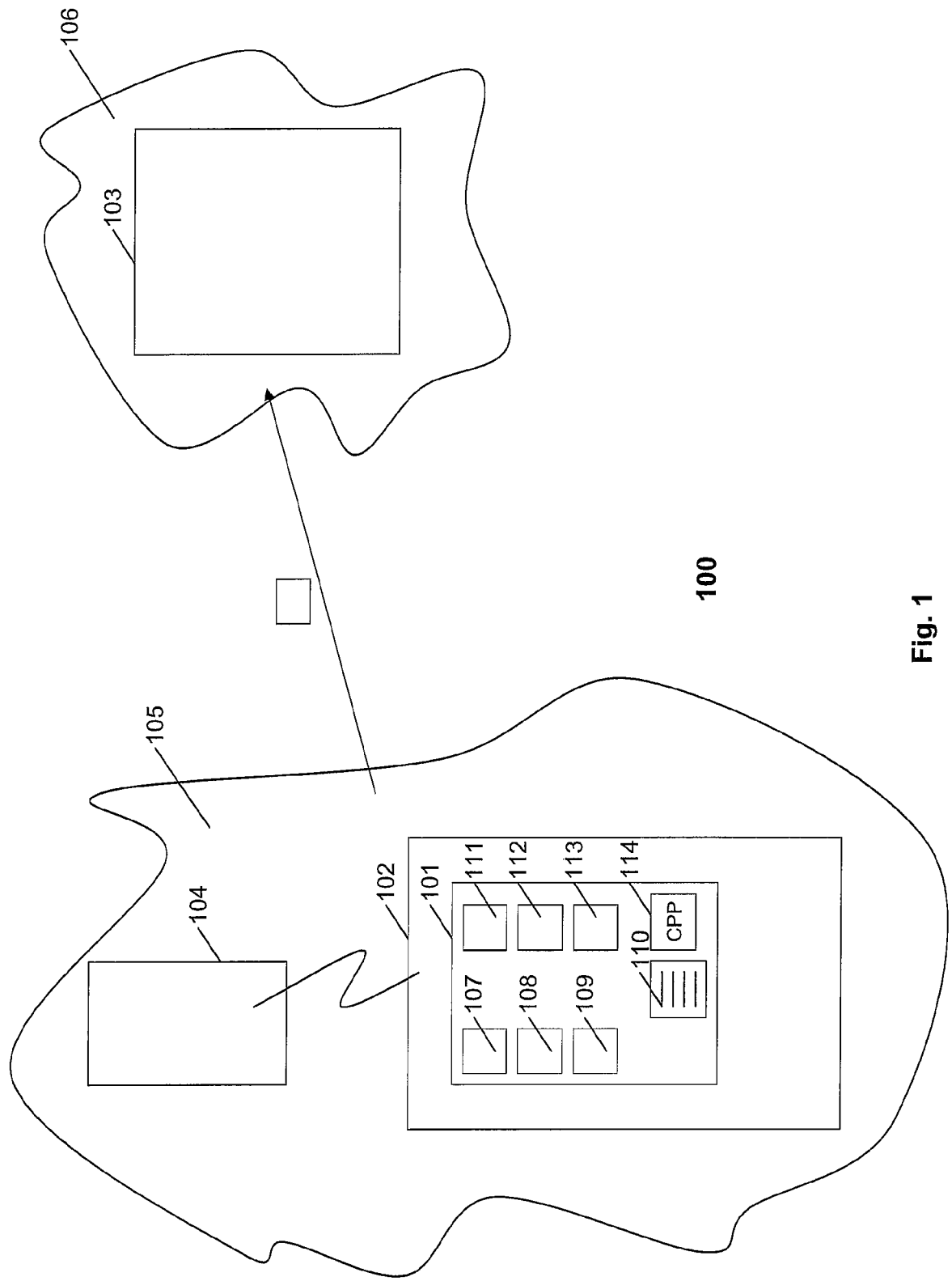
FIG. 1 shows a first block diagram of a telecommunications chip card.

FIG. 1 shows a mobile communication system 100 including a telecommunications chip card 101 coupled to a wireless terminal 102. The mobile station 102 is adapted for coupling to an access point 103. The wireless terminal 102 is adapted for coupling to a base station 104; both wireless terminal 102 and base station 104 belonging to a first network 105. The access point 103 belongs to a second network 106.

The telecommunications chip card 101 is adapted for carrying personalization data for connection to at least a mobile telecommunications network. The chip card 101 comprises means for receiving 107 a dialed telephone number from a mobile station 102 or wireless terminal. The wireless terminal 102 is coupled to the first network 105 and is adapted for initiating a call between the wireless terminal 102 and a second wireless terminal not depicted in FIG. 1. The dialed telephone number belongs to this second wireless terminal. The chip card 102 further comprises means for obtaining 108 a geographic location of the first wireless terminal 102. The geographic location may be, for example, the country where the wireless terminal is located, the city, or some more specific geographic location information.

The information about the geographic location is transmitted via the network to the wireless terminal and is stored in the chip card. For example, the network can be a GSM or UMTS network and the chip card can be a subscriber identity module (SIM) or universal subscriber identity module (USIM). The geographic location information is transmitted within a network identifier to the wireless terminal and is stored in the SIM or USIM. The network identifier is indicative for the network provider and by knowing the network provider the geographic location is also known. Thus, the network identifier comprising the geographic location is stored on the chip card.

The chip card 102 also includes means for fetching 109 an access point address from a lookup table 110 according to the geographic location. This lookup table 110 is stored in the telecommunication chip card. The access point address belongs to the access point 103 coupled to the second network 106. The access point 103 is located within the geographic location. The second network is coupled to the first network. The chip card 102 also includes means for 111 initiating a connection with the access point 103 and means for sending 112 the dialed telephone number to the access point. This information is used for establishing a connection through a third network between the first wireless terminal 102 and the second wireless terminal with the dialed telephone number.

The chip card 101 includes means for connecting 113 the call between the first and the second wireless terminal and a computer program product 114.

In operation, the chip card accesses the geographic location information stored on the chip card for looking up the geographic location, such as when a foreign telephone number is dialed or another predefined criterion is fulfilled. Then, the chip card looks up the access point address of the access point being located in the same geographic location as the chip card. The access point address can, for example, be a telephone number. Then, a connection to the access point is established and the user-dialed telephone number of the second wireless terminal is transmitted to the access point. Alternatively, the user-dialed telephone number of the second wireless terminal can be transmitted to the access point with a message, e.g. with a short message service message (SMS message).

The access point receives the user-dialed telephone number of the second wireless terminal and establishes a VoIP connection via a gateway to the second wireless terminal.

The telecommunications chip card 102 allows the routing of a call request based on the location of the wireless terminal 102 using the access point 103, also known as point of presence (POP). As the access point 103 is located in a separate network of the original mobile communication network that the mobile terminal is communicating with, the most efficient communication for the current location of the wireless terminal and for the dialed telephone number is found. The re-routing process of the call is completed without suspending the call or without any intervention of the user of the wireless terminal.

Figure 2:
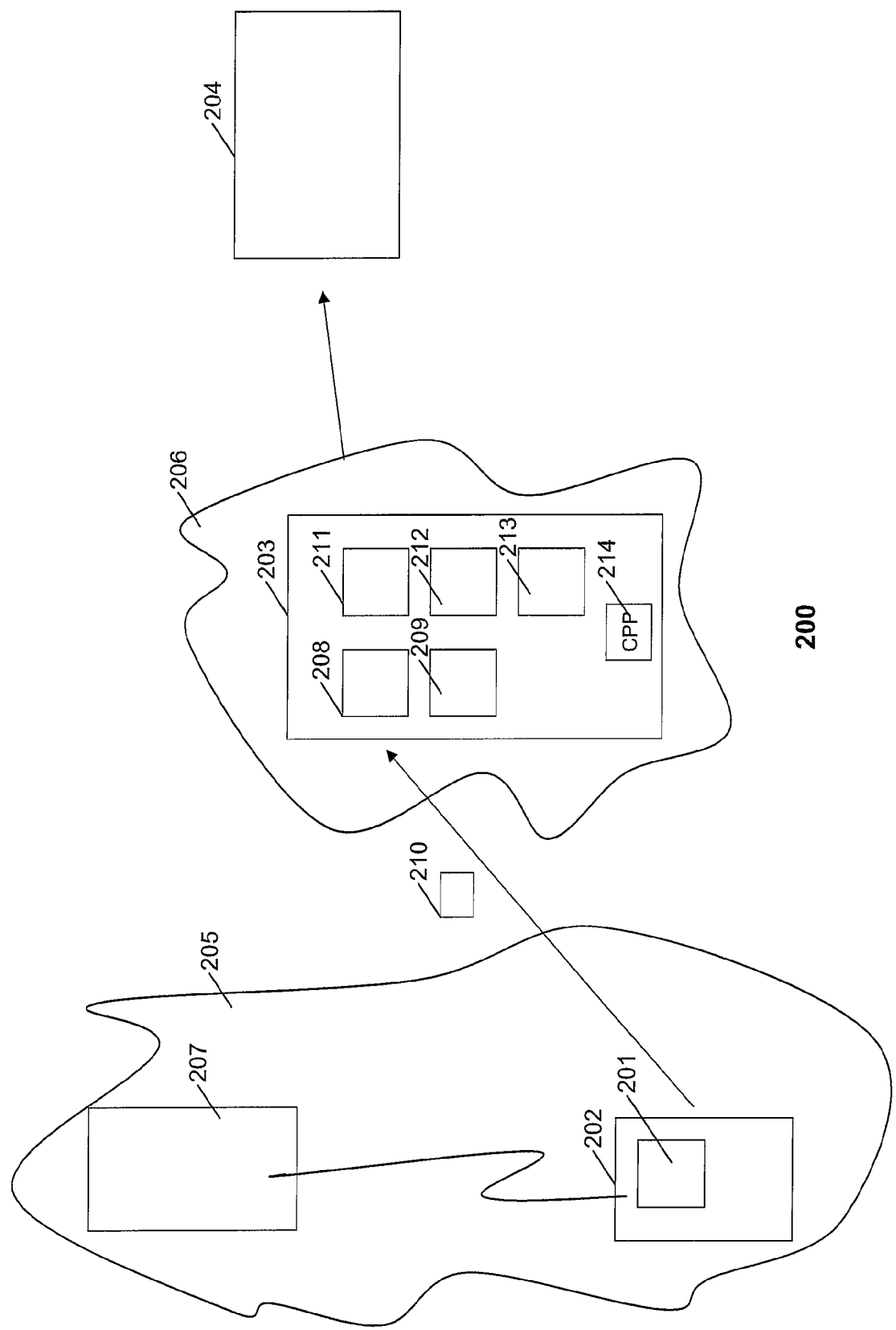
FIG. 2 shows a second block diagram of a telecommunications chip card and an access point.

FIG. 2 shows a mobile communication system 200 comprising telecommunications chip card 201 coupled to a wireless terminal 202 that is coupled to an access point 203. The access point 203 is coupled to a gateway 204 and to a second network 206. The wireless terminal 202 is coupled to the first network 205 and to a base station 207.

The access point 203 comprises means for establishing 208 a connection with the first wireless terminal 202. The access point 203 further comprises means for receiving 209 a dialed telephone number 210 from the first wireless terminal 202. This dialed telephone number 202 or address belongs to a second wireless terminal not depicted in the figure. The access point 203 also includes the means for initiating 211 a connection with the gateway 204 and means for receiving 212 a communication signal from the first wireless terminal 202.

The communication signal may be, for example, a call that the first wireless terminal 202 is establishing with the second wireless terminal or a request for data packets. The access point 202 also comprises the means for routing 213 the established connection from the first wireless terminal to the gateway for the communication with the second wireless terminal. Finally, the access point 202 comprises a computer program product 214. The dialed telephone number or address is sent to the access point with a packet switched signaling or a dual tone multi-frequency signaling (DTMF). The access point may comprise an interactive voice response system for capturing the dialed telephone number sent using the dual tone multi-frequency (DTMF).

The access point may further comprise the means for converting the communication signal from a first protocol to a second protocol, that may be for example the conversion from a signaling system 7 to the voiceover IP.

Figure 3:
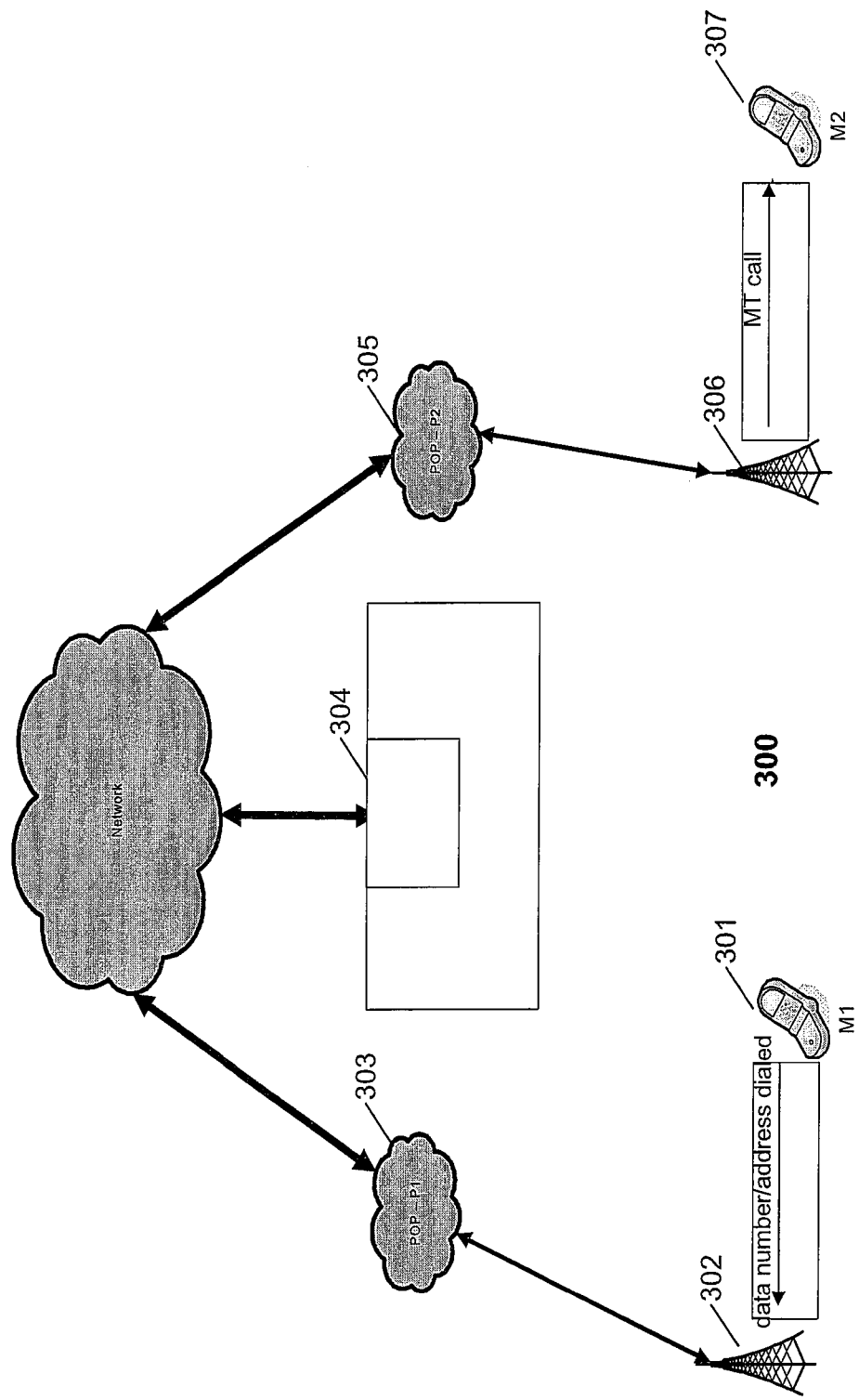
FIG. 3 shows a third block diagram of a telecommunications network.

FIG. 3 shows a mobile communication system 300 comprising a first wireless terminal 301 with a telecommunications chip card, the wireless terminal 301 coupled to a base station 302 that is coupled to an access point 303. This access point 303 is coupled to a gateway 304 that is coupled to a second access point 305. The second access point 305 is coupled to a second base station 306 coupled to a second wireless terminal 307.

When the first wireless terminal 301 attempts to call the second wireless terminal 307, an application in the telecommunications chip card or in the wireless terminal detects the geographic location of the first wireless terminal and based on the current location of the wireless terminal, the application directs the call request to the closest access point, that corresponds to the first access point 303. The first wireless terminal 301 initiates the connection by sending or signaling the dialed telephone number or the address of the second wireless terminal 307 to the first access point 303. This information is forwarded to the gateway 304. The gateway acts as a proxy between the wireless terminals 301 and the second wireless terminal 307, bridging the call. It is possible that the gateway forwards the call to a second access point 305 that connects to the base station 306, where the second wireless terminal is communicating with. The call is then processed as a normal call.

Figure 4:
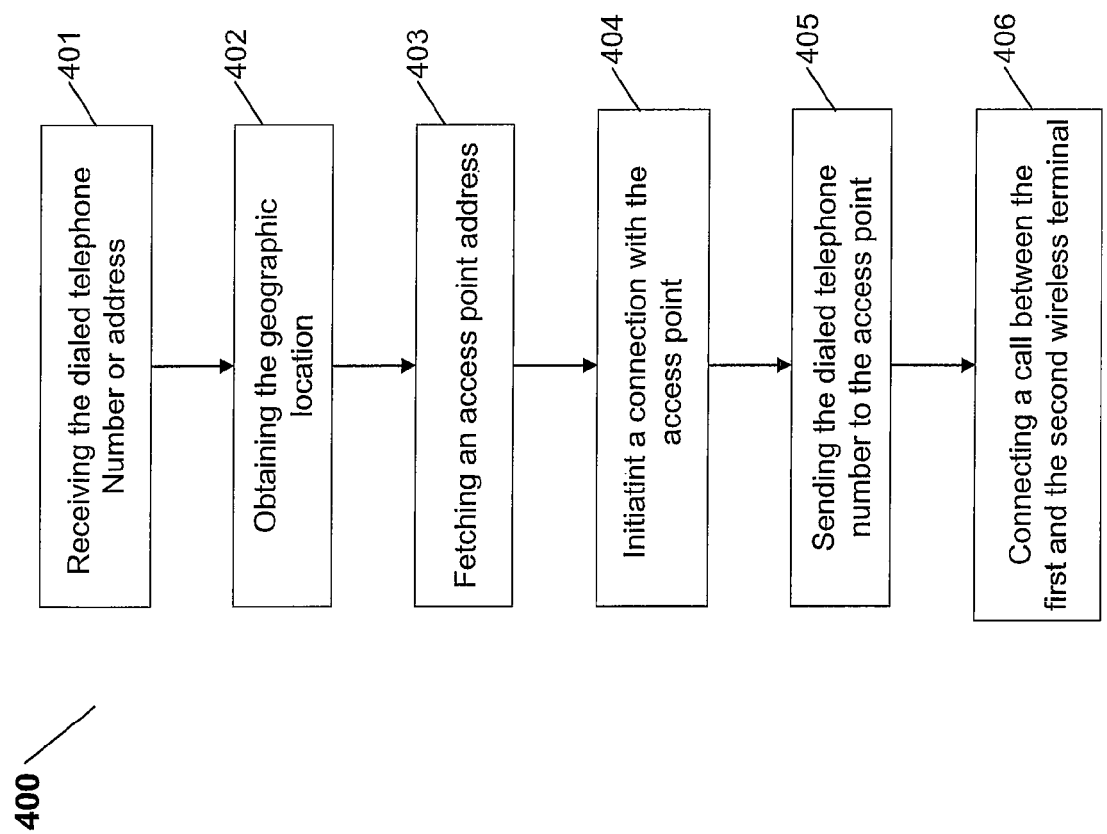
FIG. 4 shows a flowchart of a call routing method in a telecommunications chip card.

FIG. 4 shows a flowchart 400 of the call routing method in a telecommunications chip card comprising the steps of receiving 401 the dialed telephone number from a first wireless terminal coupled to a first network, wherein the first wireless terminal is adapted for initiating a call between the first wireless terminal and a second wireless terminal. The dialed telephone number belongs to the second wireless terminal. The method further comprises obtaining 402 a geographic location of the first wireless terminal, that can be located in a file of the telecommunications chip card; fetching 403 an access point address from a lookup table according to the geographic location.

The lookup table is stored in the telecommunications chip card and the access point address belongs to an access point coupled to a second network and located within the geographic location. The method further comprises initiating 404 a connection with the access point; and sending 405 the dialed telephone number to the access point for establishing a connection through a third network between the first wireless terminal and the second wireless terminal having the dialed telephone number. Finally, the method includes connecting 406 a call between the first and the second wireless terminal.

The method for routing the call may be implemented as a computer program product or as a mobile implementation in a software or hardware or a plug-in module like a telecommunications chip card or any other type of independent plug-in hardware module. The application module functions by capturing the number dialed by the first wireless terminal and buffering the number dialed off the second wireless terminal. The application does not suspend the call, but instead initiates a call to a local access point, also called point of presence (POP). According to the location of the subscriber, the application routes the call to the access point that covers the geographic location where the wireless terminal is located. This is possible as the application monitors the location of the wireless terminal and maintains at the same time a list of access points based on the location in a lookup table or database. This lookup table is maintained over the air and can be updated at any time in order to reflect the expansion of the network.

Once the call is established with the access point, the application catches the number dialed by the first wireless terminal, where the signaling can be completed using a packet switched signaling or DTMF or any direct signaling technique to the corresponding access point. The access point acts as an interface to the core network or to the core gateway to establish the call.

FIG. 5 shows a flowchart 500 of method for routing a call in an access point for a first mobile telecommunications network. The method comprises establishing 501 a connection with a first wireless terminal in a second network; receiving 502 a dialed telephone number from the first wireless terminal, wherein the dialed telephone number belongs to the second wireless terminal. The method further comprises initiating 503 a connection with a gateway; receiving 504 a communication signal from the first wireless terminal and routing 505 the established connection from the wireless terminal to the gateway for a communication with the second wireless terminal.

The access point, or point of presence (POP), acts as a first gateway to a third network or a core network. The access point is responsible for acting as the local point of presence to the core of the network and captures the number sent by the first wireless terminal, acts as a proxy agent to the first wireless terminal and communicates with a core network to establish the call to the second wireless terminal. The access point has a routing logic software or hardware to determine the location of the first and the second wireless terminal and provide the most efficient or cost effective routing of the calls between them. This routing may use the public switched telephone networking (PSTN) or by voiceover IP.

On circuit switched voice calls, the access point uses an interactive voice response system to capture the number sent by the first wireless terminal and comprises signaling system 7 functionality to enable the call routing to the second wireless terminal using the number captured by the interactive voice response platform.

The method in the access point may include converting the communication signal from a first protocol to a second protocol, wherein the first protocol is the signaling system 7 and the second protocol is voiceover IP.

For voiceover IP calls, the access point requires an interactive voice response platform to capture the number dialed by the first wireless terminal using DTMF and a codex to convert the SS7/PSDN voice called into a voiceover IP packet stream. In some systems, the signaling of the number dialed can be completed using packet switched techniques and the interactive voice response system (IVR) is replaced by an IP system that intercepts the number and acts as the core network to establish the call with a second wireless terminal. In that case, the IP domain where the access point is located, the access point requires an IP socket interface to capture the number dialed and a voiceover IP interface to route the voiceover IP data.

What is claimed is:

1. A telecommunications chip card for carrying personalization data for connection to at least a mobile telecommunications network, said telecommunications chip card further comprising:
   a telephone number receiving device, said telephone number receiving device being adapted for receiving a dialed telephone number from a first wireless terminal coupled to a first network, wherein said first wireless terminal is adapted for initiating a call between said first wireless terminal and a second wireless terminal, wherein said dialed telephone number belongs to said second wireless terminal;
   a geographic location discovery device, said geographic location discovery device being adapted for obtaining a geographic location of said first wireless terminal from the first network and storing said geographic location in the telecommunications chip card, wherein the geographic location is read from a memory location in the telecommunications chip card prior to, during, or after the initiation of the call between said first wireless terminal and said second wireless terminal;
   a look-up table, said look-up table having an access point address according to said geographic location, wherein said look-up table is stored in said telecommunications chip card, wherein said access point address belongs to an access point coupled to a second network and within said geographic location, wherein said second network is coupled to said first network;
   a connection device, said connection device being adapted for initiating a connection between the telecommunications chip card and said access point;
   a transmission device, said transmission device being adapted for sending said dialed telephone number to said access point for establishing connection through a third network between said first wireless terminal and a second wireless terminal having said dialed telephone number;
   a bridging connection device, said bridging connection device being adapted for connecting said call between said first and said second wireless terminal;
   wherein the telecommunications chip card is a subscriber identity module or a universal subscriber identity module.

2. The telecommunications chip card of claim 1, wherein said dialed telephone number is sent to said access point with a packet switched signaling or dual-tone multi-frequency signaling.

3. The telecommunications chip card of claim 1, wherein said look-up table is updated via said first network from a core network component of said first or second network.

4. The telecommunications chip card of claim 1, wherein said geographic location is stored in said telecommunications chip card.

5. The telecommunications chip card of claim 1, wherein said third network comprises a gateway adapted for establishing connection between said access point and said second wireless terminal.

6. A combination of a chip card according to claim 1, a wireless terminal and an access point for a first mobile telecommunications network, the access point comprising:
   a second connection device, said second connection device being adapted for establishing a connection with a first wireless terminal in a second network;
   a second telephone number receiving device, said second telephone number receiving device being adapted for receiving a dialed telephone number from said first wireless terminal, wherein said dialed telephone number belongs to a second wireless terminal;
   a gateway connection device, said gateway connection device being adapted for initiating a connection with a gateway;
   a communication receiving device, said communication receiving device being adapted for-receiving a communication signal from said first wireless terminal;
   a routing device, said routing device being adapted for routing said established connection from said first wireless terminal to said gateway for communication with said second wireless terminal.

7. The combination of claim 6, wherein said dialed telephone number is sent to said access point with a packet switched signaling or dual-tone multi-frequency signaling.

8. The combination of claim 6, the access point further comprising an Interactive Voice Response system for capturing said dialed telephone number.

9. The combination of claim 6, the access point further comprising a converting device capable of means for converting said communications signal from a first protocol to a second protocol, wherein said first protocol is signaling system 7 and said second protocol is voice over IP.

10. The combination of claim 6, wherein said look-up table is updated via said first network from a core network component of said first or second network.

11. The combination of claim 6, wherein said geographic location is stored in said telecommunications chip card.

12. The telecommunications chip card of claim 1, wherein the connection with said access point is accomplished via a telecommunications network.

13. The telecommunications chip card of claim 12, wherein the telecommunications network is a UMTS or GSM network.

14. A method for routing a call in a telecommunications chip card for carrying personalization data for connection to at least a mobile telecommunications network, the method comprising:
  receiving a dialed telephone number from a first wireless terminal coupled to a first network, wherein said first wireless terminal is adapted for initiating a call between said first wireless terminal and a second wireless terminal, wherein said dialed telephone number belongs to said second wireless terminal;
  obtaining a geographic location of said first wireless terminal via the first network and storing said geographic location in the telecommunications chip card;
  reading of the geographic location stored in the telecommunications chip card prior to, during, or after the initiation of the call between said first wireless terminal and said second wireless terminal;
  fetching an access point address from a look-up table according to said geographic location, wherein said look-up table is stored in said telecommunications chip card, and wherein said access point address belongs to an access point coupled to a second network and within said geographic location;
  initiating a connection between the telecommunications chip card and said access point;
  sending said dialed telephone number to said access point for establishing connection through a third network between said first wireless terminal, wherein said dialed telephone number belongs to said second wireless terminal;
  connecting said call between said first and said second wireless terminal.

15. The method of claim 14, wherein said dialed telephone number is sent to said access point with a packet switched signaling or dual-tone multi-frequency signaling.

16. The method of claim 14, the method further comprising:
  initiating a connection with a gateway by the access point;
  receiving a communication signal from said first wireless terminal by the access point;
  routing said established connection from said wireless terminal to said gateway for communication with said second wireless terminal by the access point.

17. The method of claim 16 further comprising converting said communications signal from a first protocol to a second protocol, wherein said first protocol is signaling system 7 and said second protocol is voice over IP.

18. The method of claim 14, wherein said look-up table is updated via said first network.

19. The method of claim 14, wherein said geographic location is stored in said telecommunications chip card.

20. The method of claim 14, wherein said third network comprises a gateway adapted for establishing connection between said access point and said second wireless terminal.

21. A computer program product comprising a program module, the program module stored on a non-transitory storage medium, the program module having instructions executed on a telecommunications chip card, the instructions causing the telecommunications chip card to perform a method according to claim 16.

22. The computer program product according to claim 21 comprising a further program module, the further program module having instructions executed on an access point, the instructions causing the access point to perform a method according to claim 16.

* * * * *